2,986,573
METHOD FOR THE TREATMENT OF HYPERTENSION

John G. Topliss, East Orange, Nathan Sperber, North Caldwell, and Alan A. Rubin, Bloomfield, N.J., assignors to Schering Corporation, Bloomfield, N.J., a corporation of New Jersey No Drawing. Filed Jan. 18, 1961, Ser. No. 83,357

3 Claims. (Cl. 167—65)

This invention relates to compositions of matter classified in the art of chemistry as substituted benzothiadiazines and to processes for making and using such compositions.

The invention sought to be patented, in its composition aspect, is described as residing in the concept of a chemical compound having a molecular structure in which there is attached to a 1,2,4-benzothiadiazine-1,1-dioxide nucleus, otherwise unsubstituted in the heterocyclic portion of the nucleus, a saturated lower-aliphatic hydrocarbon radical in the 3-position and a chlorine atom or its hereinafter disclosed equivalent on the benzenoid portion of the nucleus in other than the 5-position.

The invention sought to be patented, in its process aspect, is described as residing in the concept of using the tangible embodiment of a composition of matter having a molecular structure in which there is attached to a 1,2,4-benzothiadiazine-1,1-dioxide nucleus otherwise unsubstituted in the heterocyclic portion of the nucleus, a saturated lower-aliphatic hydrocarbon radical in the 3-position and a chlorine atom or its equivalent on the benzenoid portion of the nucleus in other than the 5-position, by administering to a human being such composition as the essential active ingredient of a pharmaceutical formulation for the application of anti-hypertensive therapy to human beings.

The tangible embodiments of the composition aspect of the invention possess the inherent general physical properties of being high melting, white crystalline solids; are substantially insoluble in water; are soluble in aqueous alkali from which solutions the alkali metal salts may be obtained on evaporation of water; and, are soluble in polar solvents, such as lower aliphatic alcohols. Examination of compounds produced according to the hereinafter described process reveals, upon ultraviolet and infrared spectographic analysis, spectral data confirming the molecular structure hereinbefore set forth. For example, the C=N frequency characteristic of the cyclized nucleus is evident. The aforementioned physical characteristics, taken together with the nature of the starting materials and the mode of synthesis, positively confirm the structure of the compositions sought to be patented.

The tangible embodiments of the invention possess the inherent applied use characteristics of exerting an anti-hypertensive effect in man, as evidenced by clinical evaluation.

As used herein, the term "saturated lower-aliphatic hydrocarbon" means lower-alkyl radicals, including the straight and branched-chain radicals, among which are, for purpose of illustration but without limiting the generality of the foregoing, methyl, ethyl, propyl, isopropyl, n-butyl, t-butyl, iso-amyl, and the cyclized lower alkyl radicals cyclopropyl, cyclobutyl and cyclopentyl.

The manner and process of making and using the invention will now be generally described so as to enable a person skilled in the art of chemistry to make and use the same, as follows:

The 2-sulfamyl-4-chloroaniline starting material can be prepared according to the following general procedure, which involves treating a 2,4-dichloro-nitrobenzene (I) with a mixture of thiourea, benzyl chloride, and alkali, yielding the thioether (II), which compound is then sequentially treated with chlorine in aqueous acetic acid, and then with ammonia, to yield the nitrosulfonamide (III). The nitrosulfonamide is reduced as with iron in ammonium chloride solution, to yield the 2-sulfamyl-4-chloroaniline (IV). This series of reactions is illustrated as follows:

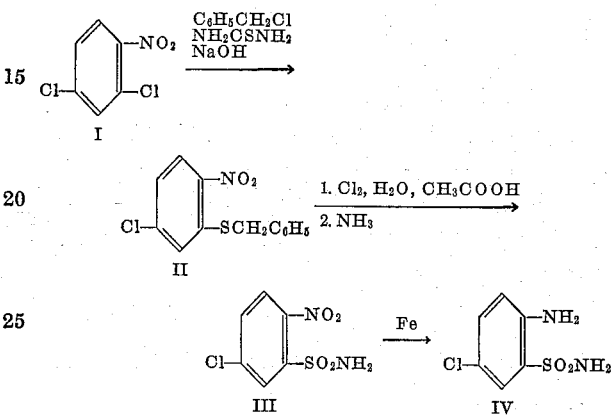

The 2-sulfamyl-3- or 5-chloroanilines, 2-sulfamyl-3- or 4- or 5-trifluoromethylanilines and 2-sulfamyl-3- or 4- or 5-bromoanilines are the full equivalents of the 2-sulfamyl-4-chloroaniline above as starting materials, and are either known compounds or can be prepared in a manner similar to that above described for preparing the 2-sulfamyl-4-chloroaniline. Each of these starting materials is useful for conducting the reaction with an ortho ester of a substituted formic acid, said acid of the formula RCOOH, R representing a saturated lower aliphatic hydrocarbon radical. This ortho ester reactant is hereinafter identified by the terms "saturated lower aliphatic hydrocarbon—substituted ortho formic ester" or merely "ortho ester." By such reaction there is produced the substituted 1,2,4-benzothiadiazine-1,1-dioxides of our invention having the same utility as the 3-methyl-7-chloro compound.

The lower aliphatic hydrocarbon substituted orthoformic esters employed as starting materials in conducting our process are generally known or are readily prepared by procedures known to those skilled in the art.

According to one procedure, the physical embodiments of our concept are made by reacting an above described 2-sulfamyl starting material with a saturated lower aliphatic hydrocarbon substituted orthoformic ester bearing the hydrocarbon moiety it is desired to have appear in the 3-position of the composition of the invention. The reaction is generally carried out at above room temperatures. When carried out in the absence of a solvent the temperature range is from about 40° C. to the boiling point of the ortho ester, although a temperature of at least about 80° C. is preferred in order to complete the reaction in a practical time. When the reaction is carried out in the presence of an inert organic solvent, the temperature is generally maintained at about the reflux temperature of the reaction mixture. The reflux reaction is generally continued for several hours until the reaction is complete. The proportion of the reactants may be in equimolar quantities, but, preferably an excess of the ortho ester is used.

Other alternative methods of producing the desired substituted 1,2,4-benzothiadiazine-1,1-dioxide can be employed. Thus, any of the aforementioned 2-sulfamyl ring-substituted anilines can be acylated with a lower aliphatic hydrocarbon carboxylic acid anhydride or a lower aliphatic hydrocarbon carbonyl chloride, to form a 1-(lower aliphatic hydrocarbon carbonyl) amino-2-sulfamyl-benzene, or a 1-(lower aliphatic hydrocarbon carbonyl) amino-2-(lower aliphatic hydrocarbon carbonyl) sulfamyl benzene, which is then cyclized by heating, yielding the substituted 1,2,4-benzothiadiazine-1,1-dioxide. It is to be noted the mono-acylated intermediate will be produced when the reaction is conducted in a non-polar inert organic solvent, such as aromatic hydrocarbons, ethers, and the like. The di-acylated intermediate will be produced when the reaction is conducted with an excess of the acylating agent in the presence of a tertiary amine such as pyridine, and the like.

It will be apparent that the 2-sulfamyl aniline may be first acylated and then chlorine introduced into the 4-position, followed by closure of the ring by heating.

The best mode contemplated by the inventors of carrying out their invention will now be set forth as follows:

EXAMPLE 1

*3-methyl-7-chloro-1,2,4-benzothiadiazine-1,1-dioxide*

A. PREPARATION OF STARTING MATERIAL

Mix 63 g. of benzyl chloride, 38 g. of thiourea, 3 drops of concentrated ammonium hydroxide solution, and 250 ml. of 95% ethanol. Reflux the mixture for 3 hours. Cool and add a solution containing 96 g. of 2,4-dichloronitrobenzene in 200 ml. of ethanol. Heat the mixture to reflux and then add drop-wise a solution of 70 g. of potassium hydroxide in 500 ml. of ethanol. Continue refluxing for 2 hours, and then cool and filter the solids produced. Wash the solid with aqueous ethanol and dry. There is thus produced 2-benzylthio-4-chloro-nitrobenzene. Suspend 50 g. of 2-benzylthio-4-chloro-nitrobenzene in 1000 ml. of 33% aqueous acetic acid. Bubble chlorine gas through the suspension during a period of 2 hours, while maintaining the suspension at a temperature in the range of about 0°-5° C.

Extract the mixture 3 times with 400 ml. each of chloroform, pool the extracts, and wash the chloroform solution with water. Dry the chloroform solution with anhydrous sodium sulfate and filter.

Evaporate the dried chloroform solution to a residue, add to the residue 400 ml. of liquid ammonia, stir and allow the excess ammonia to evaporate, triturate the residue with hexane to form a crystalline solid, continue trituration with water, and filter the solid to yield substantially pure 2-sulfamyl-4-chloro-nitrobenzene. Recrystallize from aqueous methanol. Mix together 4.4 g. of ammonium chloride, 18 ml. of methanol, 9 ml. of water and 3.0 g. of 2-sulfamyl-4-chloro-nitrobenzene. Heat the mixture to reflux. Add portionwise 4.4 g. of iron filings during a period of about 1½ hours. Cool the mixture and filter. Concentrate the filtrate to a residue. Triturate the residue with 15 ml. of water and filter the solid. Recrystallize the solid from aqueous methanol to yield substantially pure 2-sulfamyl-4-chloroaniline.

B. PREPARATION OF FINAL PRODUCT

Heat a mixture of 6 g. of 2-sulfamyl-4-chloroaniline and 15 ml. of ethyl orthacetate at 100–110° C. for 1.5 hours. Cool and filter the solids. Recrystallize from aqueous ethanol yielding 3-methyl-7-chloro-1,2,4-benzothiadiazine-1,1-dioxide. This substance is a white crystalline solid melting at 330° C. Infrared analysis of this substance showed the characteristic C=N frequency, confirming that cyclization had occurred.

The manner of using the invention sought to be patented in its process aspect will now be described:

It is well known that diuretics of the chlorothiazide type, i.e., those compounds which differ from the compounds of this invention in that they have a sulfamyl group attached to the benzenoid portion of the nucleus, usually in the 7-position, mildly reduce blood pressure in patients having hypertension. These compounds, however, do not demonstrate this activity under normotensive conditions. Quite unexpectedly, we have discovered that the tangible embodiments of this invention exhibit blood pressure lowering activity despite the fact that they possess no significant diuretic activity. Indeed, not only are the compounds non-diuretic, but in some instances they may have anti-diuretic effects.

It appears the anti-hypertensive action of our compositions does not depend upon diuresis, ganglionic blockade, or adrenergic blockade, but rather, our compositions appear directly to affect that part of the vascular system which is deranged in hypertension, i.e. the peripheral vasculature. Hence, our compositions are what may be termed as "true" anti-hypertensives, and as such, are useful as valuable thereapeutic agents for the alleviation and control of essential hypertension, malignant hypertension, and the like, and peripheral vascular disorders, e.g. Buerger's disease, Raynaud's disease, etc., angina pectoris, and the like.

The toxicity of the compound was first evaluated in mice and then in dogs with favorable results. By standard pharmacological evaluation procedures, the anti-hypertensive activity of the compounds was determined in dogs.

From our tests, we have found that our compounds will lower blood pressure in both normotensive and hypertensive dogs, the action in hypertensive dogs being slow in its onset and of long duration. Likewise, our compounds will also antagonize blood pressure responses to such well-known pressor agents as epinephrine, norepinephrine, and angiotensin. This antagonism, it should be noted, functions without any particular specificity, but rather the effect is general to the class of compounds functioning as pressor agents. A further property exhibited by our compositions is that they will significantly increase peripheral and coronary blood flow.

Preliminary toxicity studies on 3-methyl-7-chloro-1,2,4-benzothiadiazine-1,1-dioxide were conducted following the usual, well-defined, and standardized procedures as described in the pamphlet "Appraisal of the Safety of Chemicals in Foods, Drugs and Cosmetics," published in 1959 by the Association of Food and Drug Officials of the United States (Hagen, "Acute Toxicity," pg. 17; Fitzhugh, "Subacute Toxicity," pg. 26; and Fitzhugh "Chronic Oral Toxicity," pg. 36). No significant toxic effects were observed in doses up to even 20 times those of the effective dosage range of 3-methyl-7-chloro-1,2,4-benzothiadiazine-1,1-dioxide. Pilot chronic toxicity studies, which were also conducted according to the usual, and well-known procedures, were made and essentially the same results were observed.

Various well-known pharmacologic procedures were carried out in dogs and rats to ascertain the anti-hypertensive activity of 3-methyl-7-chloro-1,2,4-benzothiazine-1,1-dioxide. In the preliminary test, 3-methyl-7-chloro-1,2,4-benzothiadiazine-1,1-dioxide was intravenously injected in doses ranging from 0.5 mg. per kg. to 10 mg. per kg. At all dose concentrations the blood pressure was reduced. At the higher doses, the effect was intense and long lasting. Following these investigations, 3-methyl-7-chloro-1,2,4-benzothiadiazine-1,1-dioxide was administered intravenously to anesthetized dogs in order to ascertain its electrical and mechanical effects on myocardial tissue. In this investigation there were no observable cardio-toxic effects as reflected by electrocardiographic and myographic changes. Acute studies were then carried out in normotensive and hypotensive dogs, the latter being prepared according to the technique of Goldblatt et al. (J. Exper. Med., 59, 347–379, 1934). Intravenous (5 mg. per kg.) and oral (25–50 mg. per kg.) administration produced significant hypotensive effects. In chronic studies on normotensive and hypertensive dogs, daily oral administration of 5 mg. per kg. effectively reduced arterial blood pressure for the duration of the experiments (7–21 days).

In similar studies on hypertensive rats (prepared by implantation of desoxycorticosterone acetate pellets, plus maintainance on saline) it was observed that daily oral administration of 10–20 mg. per kg. also reduced and maintained reduction of arterial blood pressure for the duration of the experiments (4–8 weeks).

The foregoing pharmacological results were confirmed clinically, a representative clinical history being as follows: A 50 year old male, having a blood pressure varying between 200/120 and 230/140 and having a long-term history of essential hypertension was placed on placebo for six days. No change in blood pressure was evident during this period. The patient was given gradually increasing doses of 3-methyl-7-chloro-1,2,4-benzothiadiazine-1,1-dioxide at the rate of 100 mg. per day for 3 days, 150 mg. per day for 2 days, 200 mg. per day for 3 days, and then 300 mg. per day for 16 days. Within five days from the start of drug therapy the patient's blood pressure showed a definite and continued trend of diminution, until on or about the twentieth day the blood pressure was as low as 120/70. The patient's blood pressure returned to his previous "normal" within one week after therapy stopped.

The effective dosage of the compounds of this invention depends upon the severity, the stage, and the individual characteristics of each case and will be determined by an attending physician. Generally, a dosage range of from 0.25 to about 15 mg. per kg. of body weight per day constitutes the overall range, with a range of about 0.25 to 5 mg. per kg. per day for the preferred compounds. Specifically, the following represents acceptable total daily doses for 3-methyl-7-chloro-1,2,4-benzothiadiazine-1,1-dioxide, 0.5–5 mg. per kg.;
3-ethyl-7-chloro-1,2,4-benzothiadiazine-1,1-dioxide, 0.5–5 mg. per kg.;
3-methyl-6-chloro-1,2,4-benzothiadiazine-1,1-dioxide, 1–10 mg. per kg.;
3-ethyl-6-chloro-1,2,4-benzothiadiazine-1,1-dioxide, 0.5–5 mg. per kg.;
3-n-pentyl-6-chloro-1,2,4-benzothiadiazine-1,1-dioxide, 1–10 mg. per kg.;
3-cyclopropyl-6-chloro-1,2,4-benzothiadiazine - 1,1 - dioxide, 0.25–2.5 mg. per kg.;
3-n-butyl-7-chloro-1,2,4-benzothiadiazine-1,1-dioxide, 2–20 mg. per kg.;
3-methyl-6-trifluoromethyl-1,2,4-benzothiadiazine-1,1 - dioxide, 0.25–2.5 mg. per kg.;
3-ethyl-6-trifluoromethyl-1,2,4-benzothiadiazine - 1,1 - dioxide, 0.25–2.5 mg. per kg.;
3,6-dimethyl-7-chloro-1,2,4-benzothiadiazine - 1,1 - dioxide, 2–20 mg. per kg.;
3.7-dimethyl-6-chloro-1,2,4-benzothiadiazine - 1,1 - dioxide, 2–20 mg. per kg.

Representative formulations embodying the composition of Example 1 are:

Tablet formulation

The following formulation provides for the manufacture of 1000 tablets:

| | Grams |
|---|---|
| (1) 3 - methyl - 7 - chloro - 1,2,4 - benzothiadiazine-1,1-dioxide | 25 |
| (2) Lactose, U.S.P. | 181 |
| (3) Corn starch, U.S.P. | 92.5 |
| (4) Magnesium stearate | 1.5 |

Thoroughly granulate a mixture of 72.5 g. of corn starch and the lactose with a paste prepared by dissolving 20 gm. of corn starch in 100 ml. of hot distilled water. Dry the resulting granulation at 40–45° C. and pass it through a No. 16 mesh screen. To be dried, screened granulation add a blended mixture of the active ingredient (1) and the magnesium stearate. Thoroughly blend and then press into tablets of 300 mg. each.

Capsule formulation

The following formulation provides for the manufacture of 1000 capsules:

| | Grams |
|---|---|
| (1) 3 - methyl - 7 - chloro - 1,2,4 - benzothiadiazine-1,1-dioxide | 25 |
| (2) Lactose | 273.5 |
| (3) Magnesium stearate | 1.5 |

Mix active ingredient (1) with the lactose and blend in the magnesium stearate. Fill hard gelatin capsules with 300 mg. each of the blended mixture to produce capsules containing 25 mg. of 3-methyl-7-chloro-1,2,4-benzothiadiazine-1,1-dioxide.

Parenteral formulation

The following formulation provides for the manufacture of 1000 vials each containing 10 mg. of active ingredient, as its sodium salt:

| | | |
|---|---|---|
| (1) 3-methyl-7-chloro - 1,2,4-benzothiadiazine-1,1-dioxide sodium salt | gm | 10.95 |
| (2) Monobasic potassium phosphate | do | 6.0 |
| (3) Water for injection, U.S.P.q.s. | liter | 1.0 |

Dissolve ingredients (1), (2), and (3) in approximately 80 percent of the volume of water and filter the resulting solution. Add to the filtrate sufficient water to make to a 1000 ml. volume. Sterile-filter the solution and aseptically fill one milliliter portions of the so-prepared solution into two milliliter vials then lyophylize. After the lyophilized cake is dry, aseptically stopper the vials with rubber plugs and seal.

The modifications of the saturated lower aliphatic hydrocarbon radical in the 3-position of tangible embodiments of the molecular structure of the invention are illustrated by the 3-ethyl-7-chloro compound having a melting point of 267°–269° C.; the 3-ethyl-6-chloro compound having a melting point of 276°–277° C.; the 3-methyl-7-bromo compound having a melting point of 335°–337° C.; the 3-methyl-8-chloro compound having a melting point of 264°–266° C.; the 3-ethyl-7-chloro compound having a melting point of 268°–270° C.; the 3-ethyl-6-chloro compound having a melting point of 267°–268° C.; the 3-n-propyl-6-chloro compound having a melting point of 266°–267° C.; the 3-iso-propyl-6-chloro compound having a melting point of 285°–287° C.; the 3-iso-butyl-6-chloro compound having a melting point of 275°–278° C.; the 3-n-heptyl-6-chloro compound having a melting point of 241°–242° C.; the 3-ethyl-6-trifluoromethyl compound having a melting point of 312° C.; the 3-n-butyl-7-chloro compound having a melting point of 213°–214° C.; the 3-t-butyl-7-chloro compound having a melting point of 292°–293° C.; the 3-n-pentyl-7-chloro compound having a melting point of 209°–210° C.; the 3-n-hexyl-6-chloro compound having a melting point of 246°–248° C.; the 3-t-butyl-6-chloro compound having a melting point of 321° C.; the 3-cyclopropyl-6-chloro compound having a melting point of 261°–263° C.; the 3-cyclopentyl-6-chloro compound having a melting point of 312°–314° C.; the 3-cyclohexyl-6-chloro compound having a melting point of 319°–320° C.; the 3-n-pentyl-7-chloro compound having a melting point of 285°–286° C.; the 3-t-amyl-7-chloro compound having a melting point of 212–214° C.

It is known to chemists that a 1,2,4-benzothiadiazine-1,1-dioxide may exist in either one of both of two tautomeric forms. In one form the double bond is between the 3- and 4-position atoms, while in the other form the double bond is between the 2- and 3-position atoms. The inventors contemplate either or both tautomeric structures as within the scope of their invention.

We have also made the composition constituting the invention with certain substituents, other than those hereinbefore enumerated, added to the benzenoid portion of the benzothiadiazine nucleus and have determined by pharmacological evaluation that the toxicity of and the anti-hypertensive activity of the composition so modified is not materially affected. For example, the 3,6-dimethyl-7-chloro-1,2,4-benzothiadiazine-1,1-dioxide, melting at 334 degrees centigrade, produced an anti-hypertensive effect, without appreciable change in toxicity from that of the 3-methyl-7-chloro compound, as did also the 3,7-dimethyl-6-chloro compound, melting at 301-302 degrees centigrade. Such additions to the molecular structure of the inventive concept herein described are, therefore, equivalents of the subject matter sought to be patented. On the basis of our experiments we have determined that substituents cannot be added to the heterocyclic portion of the nucleus, other than that herein described in the 3-position, nor may the state of oxidation of the heterocyclic portion be altered, without material loss of the anti-hypertensive activity of the resulting product.

The following example illustrates an alternative method for preparation of compositions of the invention.

EXAMPLE 2

*3-cyclopropyl-6-chloro-1,2,4-benzothiadiazine-1,1-dioxide*

Reflux for 6 hours a mixture of 6.0 g. of 2-sulfamyl-5-chloroaniline and 15.3 g. of cyclopropane carbonylchloride in 150 ml. of dry benzene. Cool and filter to yield 2-sulfamyl - 5 - chloro - N - cyclopropanecarbonylaniline. Heat, with stirring, a suspension of 5.8 g. of 2-sulfamyl-5-chloro-N-cyclopropanecarbonylaniline in 10 ml. of mineral oil at 225° C. for 30 minutes. Cool and filter to yield crude 3-cyclopropyl-6-chloro-1,2,4-benzothiadiazine-1,1-dioxide. Upon purification by recrystallization from methanol, the pure product melts at 261-263° C.

It will be apparent that the 2-sulfamylaniline may be first acylated and then chlorine introduced in the 4-position, followed by closure of the ring by heating to produce the compounds of the invention. This procedure is illustrated by the following example.

EXAMPLE 3

*3-methyl-7-chloro-1,2,4-benzothiadiazine-1,1-dioxide*

A. (2-N-ACETYLSULFAMYL)-ACETANILIDE

Add 10 g. of 2-sulfamylaniline to 10 ml. of pyridine and 20 ml. of acetic anhydride. Heat for 3 hours at 50-60° C. and allow to stand overnight. Filter to separate the solids thus produced and recrystallize from ethanol. Yield 10.7 g. of 2-(N-acetylsulfamyl)-acetanilide, having a melting point of 199-200° C. Add to a previously prepared solution of 1.5 g. of chlorine in 31 ml. of acetic acid, a mixture of 3.0 g. of 2-(N-acetylsulfamyl)-acetanilide and 20 ml. of acetic acid. Allow to stand at room temperature for 3 hours and then evaporate to dryness on a steam both under reduced pressure. Recrystallize the resulting solid residue from ethanol. Yield 3.0 g. of 2-(N-acetylsulfamyl)-4-chloroacetanilide. Fuse this compound in an oil bath at 250-360° C. for 15 minutes. Cool and recrystallize the product so obtained from 80% aqueous ethanol. The 3-methyl-7-chloro-1,2,4-benzothiadiazine-1,1-dioxide melts at 330° C.

It is apparent to a chemist skilled in the art that our novel compounds are acidic in character and, indeed, are soluble in aqueous alkali. The alkali metal salts of our compounds may be prepared by methods well-known in the art for the preparation of a salt of a strong base with a weak acid. Although the alkaline metal salt, as indicated hereintofore, may be obtained on evaporation of an alkaline solution of a compound of this invention, we prefer to employ non-aqueous media. For example, by mixing together an alcoholic solution of a compound of our invention with an alcoholic solution containing a stoichiometric quantity of an alkali metal alkoxide and after evaporating the solvent, there is obtained the alkali metal salt. In particular, by reacting stoichiometric quantities of 3-methyl-7-chloro-1,2,4-benzothiadiazine-1,1-dioxide and sodium methoxide in anhydrous methanol, and evaporating the solvent, there is obtained the sodium salt of 3-methyl-7-chloro-1,2,4-benzothiadiazine-1,1-dioxide as a white solid which is soluble in water.

The subject matter which the applicants regard as their invention is particularly pointed out and distinctly claimed as follows:

1. The process for the application of anti-hypertensive therapy to human beings which comprises administering a pharmaceutical formulation comprising a composition having a molecular structure in which there is attached, to a 1,2,4-benzothiadiazine-1,1-dioxide nucleus otherwise unsubstituted in the heterocyclic portion of the nucleus, a saturated lower-aliphatic hydrocarbon radical in the 3-position and a chlorine atom on the benzenoid portion of the nucleus in the 7-position.

2. The process for the application of anti-hypertensive therapy to human beings which comprises administering a pharmaceutical formulation comprising 7-chloro-3-methyl-1,2,4-benzothiadiazine-1,1-dioxide.

3. The process for the application of anti-hypertensive therapy to human beings which comprises administering a pharmaceutical formulation comprising a composition having a molecular structure in which there is attached, to a 1,2,4-benzothiadiazine-1,1-dioxide nucleus otherwise unsubstituted in the heterocyclic portion of the nucleus, a saturated lower-aliphatic hydrocarbon radical in the 3-position and a chlorine atom on the benzenoid portion of the nucleus in the 6-position.

References Cited in the file of this patent

UNITED STATES PATENTS 2,910,475     Novello                Oct. 27, 1959

OTHER REFERENCES

Scott: Journal Chemical Society (London), vol. 123, pages 3191-3203 (1923).

Chem. Abstr., vol. 45, col. 1144 (1951), Abst. of Parke et al., J. Chem. Soc. London, pp. 1760-1763 (1950).

Freis et al.: J.A.M.A., 166:2, pp. 137-140, Jan. 11, 1958.

Novello et al.: J.O.C., vol. 25, pp. 970-981, June 1960.